United States Patent
Lin

(10) Patent No.: US 7,837,389 B2
(45) Date of Patent: Nov. 23, 2010

(54) ROLLING ELEMENT CHAIN SYSTEM FOR A LINEAR GUIDEWAY

(75) Inventor: Yun-Yi Lin, Taichung (TW)

(73) Assignee: Hiwin Technologies Corp., Taichung (TW)

(*) Notice: Subject to any disclaimer, the term of this patent is extended or adjusted under 35 U.S.C. 154(b) by 436 days.

(21) Appl. No.: 12/123,467

(22) Filed: May 20, 2008

(65) Prior Publication Data
US 2009/0290819 A1 Nov. 26, 2009

(51) Int. Cl.
*F16C 29/06* (2006.01)

(52) U.S. Cl. .......................... 384/45; 384/51

(58) Field of Classification Search .............. 384/45, 384/51, 43, 44
See application file for complete search history.

(56) References Cited

U.S. PATENT DOCUMENTS

| | | | | |
|---|---|---|---|---|
| 6,364,086 B1 * | 4/2002 | Blaurock et al. | ....... | 193/35 MD |
| 7,320,547 B2 * | 1/2008 | Kuo et al. | ...................... | 384/45 |
| 7,563,028 B2 * | 7/2009 | Liao et al. | ...................... | 384/45 |
| 7,632,018 B2 * | 12/2009 | Chen et al. | ..................... | 384/51 |
| 7,736,060 B2 * | 6/2010 | Matsumoto et al. | ........... | 384/45 |
| 2002/0044703 A1 * | 4/2002 | Itabashi | ....................... | 384/45 |
| 2007/0076989 A1 * | 4/2007 | Matsumoto et al. | ........... | 384/45 |
| 2007/0160313 A1 * | 7/2007 | Kuo et al. | ..................... | 384/51 |
| 2008/0085067 A1 * | 4/2008 | Hsu et al. | ..................... | 384/45 |
| 2008/0199112 A1 * | 8/2008 | Mizumura et al. | ............ | 384/45 |

FOREIGN PATENT DOCUMENTS

| JP | 2607933 B2 * | 5/1997 |
|---|---|---|
| JP | 11294452 A * | 10/1999 |
| JP | 3243415 B2 * | 10/2001 |
| JP | 3263005 B2 * | 3/2002 |

* cited by examiner

*Primary Examiner*—Thomas R Hannon
(74) *Attorney, Agent, or Firm*—Banger Shia

(57) ABSTRACT

A rolling element chain system for a linear guideway comprises a slide rail, a slide block, a plurality of rolling elements and a rolling element chain. The circulating path of the slide block is interiorly provided with a guiding groove with a width C, and the rolling elements roll within the circulating path and are confined by the rolling element chain. The rolling element chain has a plurality of spacers for separating the rolling elements from one another and linking portions with a thickness t for linking the rolling elements with one another. The spacer at each end of the rolling element chain has a retaining capacity B for holding the corresponding rolling element. The above structure satisfies the relation: $C < t + B/\pi$.

5 Claims, 7 Drawing Sheets

ROLLING ELEMENT CHAIN SYSTEM FOR A LINEAR GUIDEWAY

BACKGROUND OF THE INVENTION

1. Field of the Invention

The present invention relates to a linear guideway, and more particularly to a rolling element chain system for a linear guideway, which can avoid the occurrence of interference, can create radial freedom and can effectively avoiding the falling-off of the rolling elements and can further make every rolling element share the load evenly.

2. Description of the Prior Art

Nowadays, linear guiding devices are applied in the industry more and more, besides the high precision effect for the linear feed transmission, it further has the advantages of low frictional loss ratio, high energy-conversion ratio, low noise, and high rigidity not easy to damage etc. Hence, it is self-evident that the linear guideway is very important to the existing various industrial mechanisms. A common linear guiding device is a linear guideway consisting of a slide block, a slide rail and rolling elements interposed between the slide block and the slide rail, and the rolling elements linearly move and rotate within the track defined by the slide block and the slide rail, but the rolling elements are placed into a rolling element chain one by one and are retained and separated by the chain in order to achieve the following objectives:

1. preventing the rolling elements from falling off the slide block when the slide block disengages from the slide rail;

2. avoiding increase of frictional force caused by mutual contact of the rolling elements; and 3. enabling the rolling elements to be positioned regularly to achieve the smooth movement.

The common conventional rolling element chains include two types of chains, one is end-type and the other is endless-type.

The rolling element chains disclosed in JP Pat. No. 3243415, as shown in FIG. 1 and JP Pat. No. 3263005, as shown in FIG. 2 are both end-type. In JP Pat. No. 3243415, there is a clearance between the two ends of the chain 10. In JP Pat. No. 3263005, a rolling element 101A is placed between the two ends 11A of the chain 10A, but there is still a clearance 12A between the two ends 11A and the rolling element 10A. The above two conventional chains will have the following disadvantages due to the influence of the clearance.

The disadvantages of the conventional chain disclosed in JP Pat. No. 3243415 are described as follows.

1. The two ends of the chain 10 are free due to the clearance therebetween, so the chain is likely to sway during use, or even worse, the two ends 11 might impact or cause frictional interference with the return path when passing through it;

2. In addition, when passing through the return path, since the two ends 11 of the chain 10 are disconnected from each other, the two ends 11 will shift toward the outer edge of the return path in such a manner that the two sides of each of the rolling elements 12 neighboring to the two ends 11 are not symmetrical, causing the discontinuous unsmooth operation of the linear device, and the smoothness of the operation is further worsened when the two ends 11 impact or interfere with the return path.

Regarding the JP Pat. No 3263005: the rolling element 101A between the both ends 11A can prevent the ends 11A of the chain 10A from shifting toward the outer edge of the return path, ensuring a smooth operation. In order to avoid excessive justle caused by the fact that the chain 10A might be lengthened after a long time of use, the clearance is left between the rolling element 101A and the two ends 11A, however, the problem is that the rolling elements 101A are not evenly distributed, furthermore, the rolling element 101A is not confined and likely to fall off the rail.

In order to overcome the above problems, devices, such as are disclosed in JP Pat. Publication No. 11-294452, as shown in FIG. 3 and JP Pat. No. 2607993 as shown in FIG. 4, are developed on the market. In JP Pat. Publication No. 11-294452, the rolling element chain 14 is an endless chain with both ends 15, 16 engaged with each other. In JP Pat. No. 2607993, the chain 17 is integrally formed as an endless structure, and the rolling elements 18 are retained in the chain 17 respectively. The above two conventional chains can avoid the previous impact problem, but they still have the following problems to be improved.

The above conventional chain 14 or chain 17 is likely to cause shortening stress and stretching stress continuously with collision of the rolling elements, and these designs are unable to reserve extension space for the chain 14 or the chain 17, so there is no radial freedom for absorbing the entire length variation of the chain, still causing the unsmooth movement.

This problem is more obvious in JP Pat. No. 2607993, although every rolling element 18 can share the load evenly, the radial size variation cannot be absorbed. On the other hand, when it needs to readjust the pre-load, the number of the rolling elements 18 must be adjusted. However, since the chain 17 is integrally formed, the number of the rolling elements 18 is fixed and unchangeable since it has to break the chain 17 if want to add or remove rolling elements 18.

The present invention has arisen to mitigate and/or obviate the afore-described disadvantages.

SUMMARY OF THE INVENTION

The primary objective of the present invention is to provide a rolling element chain system for a linear guideway, which can avoid the occurrence of interference and keep the operation smooth.

The secondary objective of the present invention is to provide a rolling element chain system for a linear guideway, which has adequate radial freedom.

Another objective of the present invention is to provide a rolling element chain system for a linear guideway, which can make every rolling element share the load evenly.

In order to achieve the above objectives, the rolling element chain system for a linear guideway in accordance with the present invention comprises a slide rail, a slide block, a plurality of rolling elements and a rolling element chain. The circulating path of the slide block is interiorly provided with a guiding groove with a width C. The rolling elements roll within the circulating path while being confined by the rolling element chain. The rolling element chain has a plurality of spacers for separating the rolling elements from one another and has linking portions with a thickness t for linking the rolling element with one another. The rolling elements are each located between every two neighboring spacers, and the spacer at each end of the chain has a through hole in the moving direction of the chain. The vertical depth that the rolling element is inserted in the through hole is the retaining capacity B for holding the rolling element. In addition, the present invention satisfies the relation: $C < t + B/\pi$.

The key point of the present invention is that the present invention satisfies the relation: $C < t + B/\pi$, both ends of rolling element chain of the present invention can be guided while the rolling elements are unlikely to fall off the slide block. The geometrical relation between the thickness t of the linking portion of the rolling element chain, the width C of the guiding groove of the slide block and the retaining capacity B of the rolling element chain confines the rolling element between both ends of the chain in such a manner that the rolling element between both ends of the chain can confine and guide the rolling element chain appropriately when passing the return portion. Meanwhile, the spacers at the both ends of the rolling element chain can also appropriately confine the rolling element therebetween and consequentially prevent the rolling element from falling off the slide block.

Hence, the present invention can keep the radial freedom while absorbing the size variation and is unlikely to cause interference, and the rolling elements are unlikely to fall off.

It is to be noted that, with the restriction of the relation $C<t+B/\pi$, every rolling element can share the load evenly, especially the rolling element between the both ends of the rolling element chain will behave the same as other rolling elements do. By such arrangements, no uneven failure stress is caused, and the entire rolling element chain can circulate the same as the integrated chain as disclosed in JP Pat. No. 2607993 but can solve the disadvantages of the integrated chain as disclosed in JP Pat. No. 2607993.

The rolling element chain in accordance with the present invention circulates in the guiding groove. Besides that the thickness of the linking portion must be smaller than the width of the guiding groove, in order to enable the spacers at both ends of the rolling element chain to retain the rolling elements effectively, the present invention utilizes the following relation to calculate the width C of the guiding groove of the rolling element chain and the thickness t of the linking portion of the rolling element chain and utilizes the geometrical relation to work out the optimal range of the width C of the guiding groove. The calculation process is described as follows:

$$2\times[\pi(R_o-t/2)-\pi(R_i+t/2)]<2B, \text{ so it can obtain the relation:}$$

$$R_o-R_i<t+B/\pi.$$

Since the width C of the guiding groove satisfies the relation:

$$C=R_o-R_i, \text{ so it can obtain the relation: } C<t+B/\pi.$$

Wherein:

$R_o$ is the distance from the inner side of the guiding groove to a central axis of the return portion;

$R_i$ is the distance from the outer side of the guiding groove to the central axis of the return portion.

Therefore, this relation can be used to determine the optimal relation between width C of the guiding groove of the rolling element chain and the thickness t of the linking portion of the rolling element chain.

It is to be noted that, a rolling element chain in accordance with another embodiment can comprises a plurality of spacers, an integrated linking portion located at two sides of the respective spacers for linking them with one another. The respective rolling elements are located between every two neighboring spacers. The spacer at the each end of the chain is formed at both sides thereof with an arc-shaped contacting surface facing outwards. The vertical height that the rolling element is embedded in the arc-shaped contacting surface is the retaining capacity B to hold the rolling element. Moreover, the present embodiment of the present invention also satisfies the relation:

$$C<t+B/\pi.$$

DETAILED DESCRIPTION OF THE PREFERRED EMBODIMENTS

Figure 1:
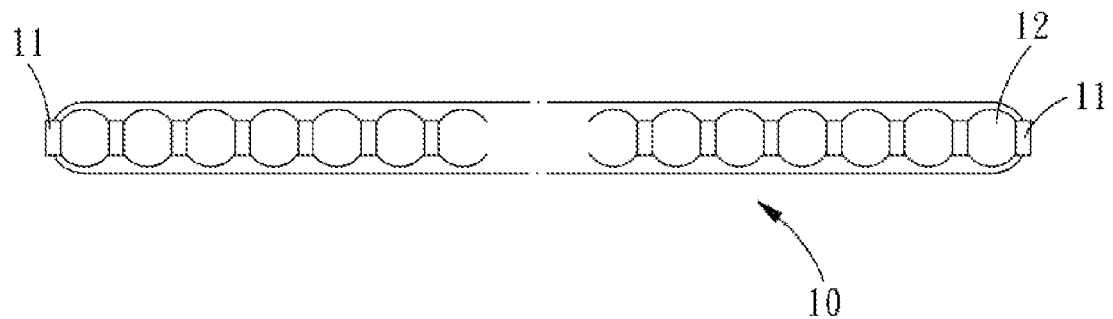
FIG. 1 is a plane view of a first conventional rolling element chain.
Figure 2:
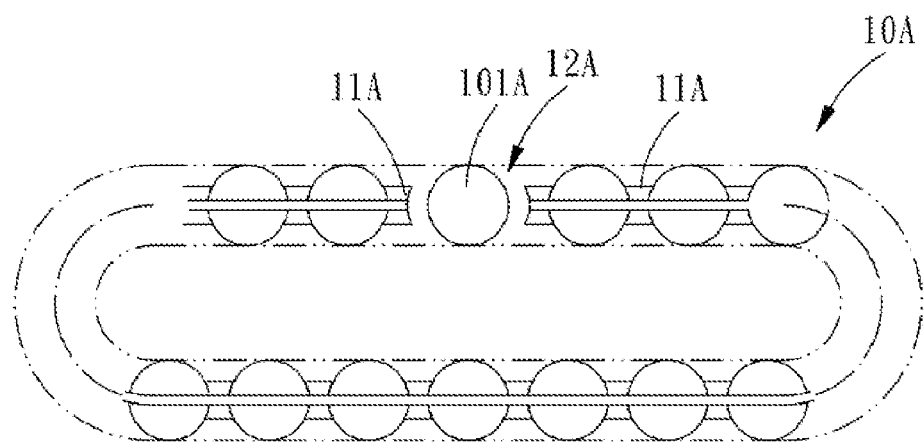
FIG. 2 is a plane view of a second conventional rolling element chain.
Figure 3:
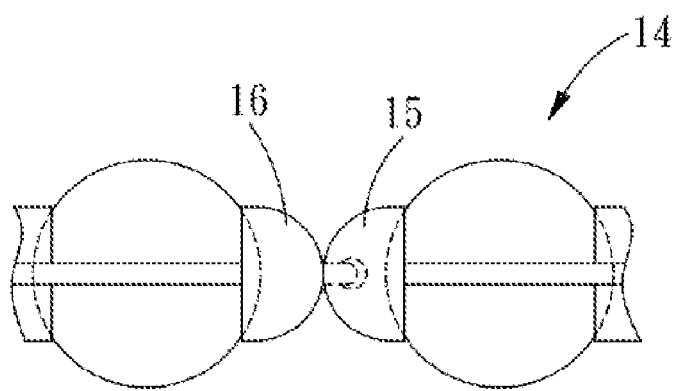
FIG. 3 is a schematic view showing that free ends of a third conventional rolling element chain.
Figure 4:
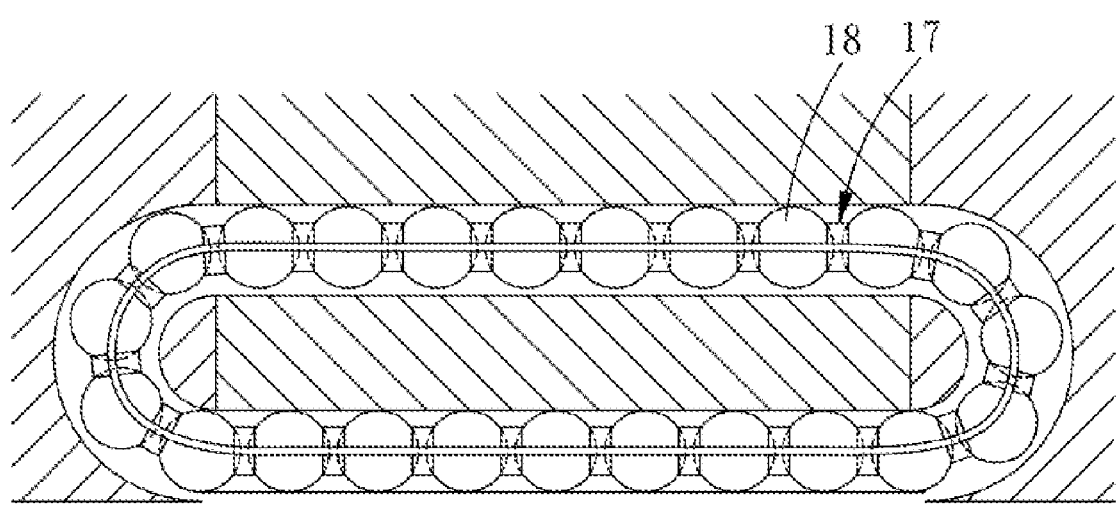
FIG. 4 is a cross-sectional view of a fourth conventional rolling element chain.
Figure 5:
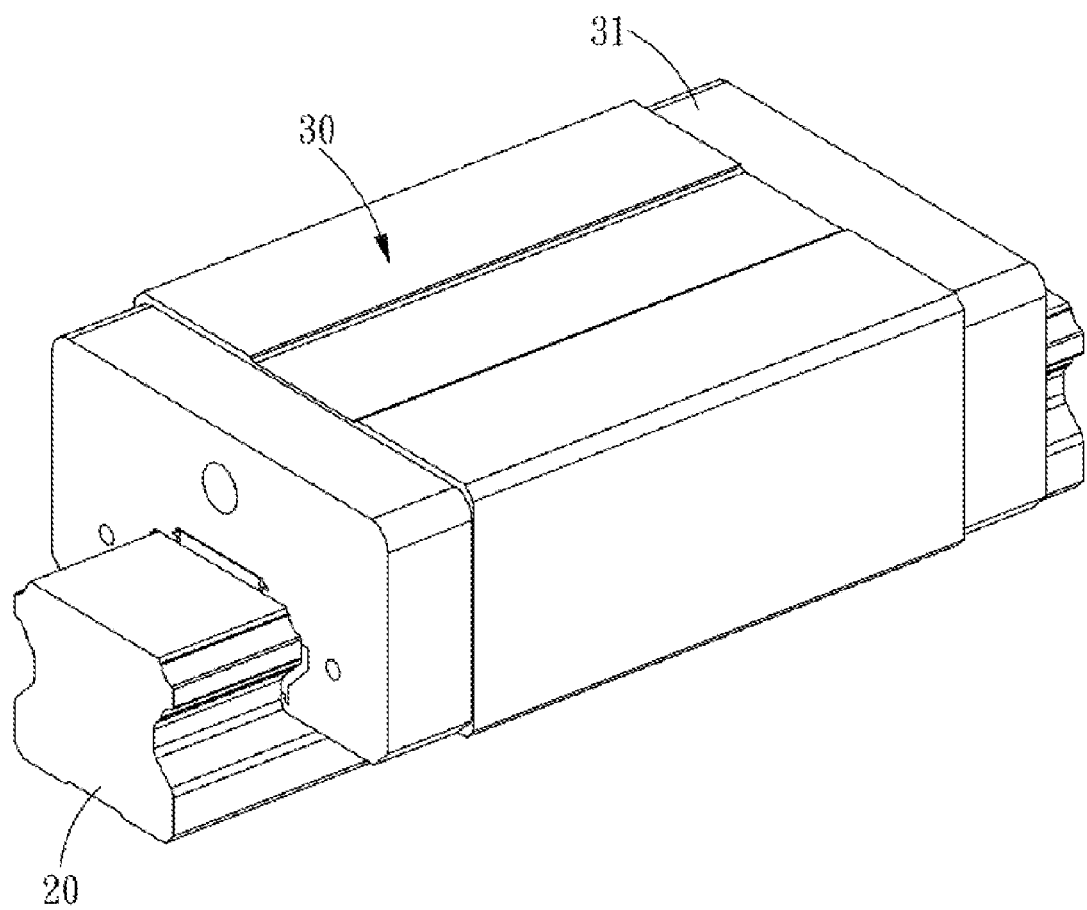
FIG. 5 is a perspective view of a rolling element chain system for a linear guideway in accordance with the present invention.
Figure 6:
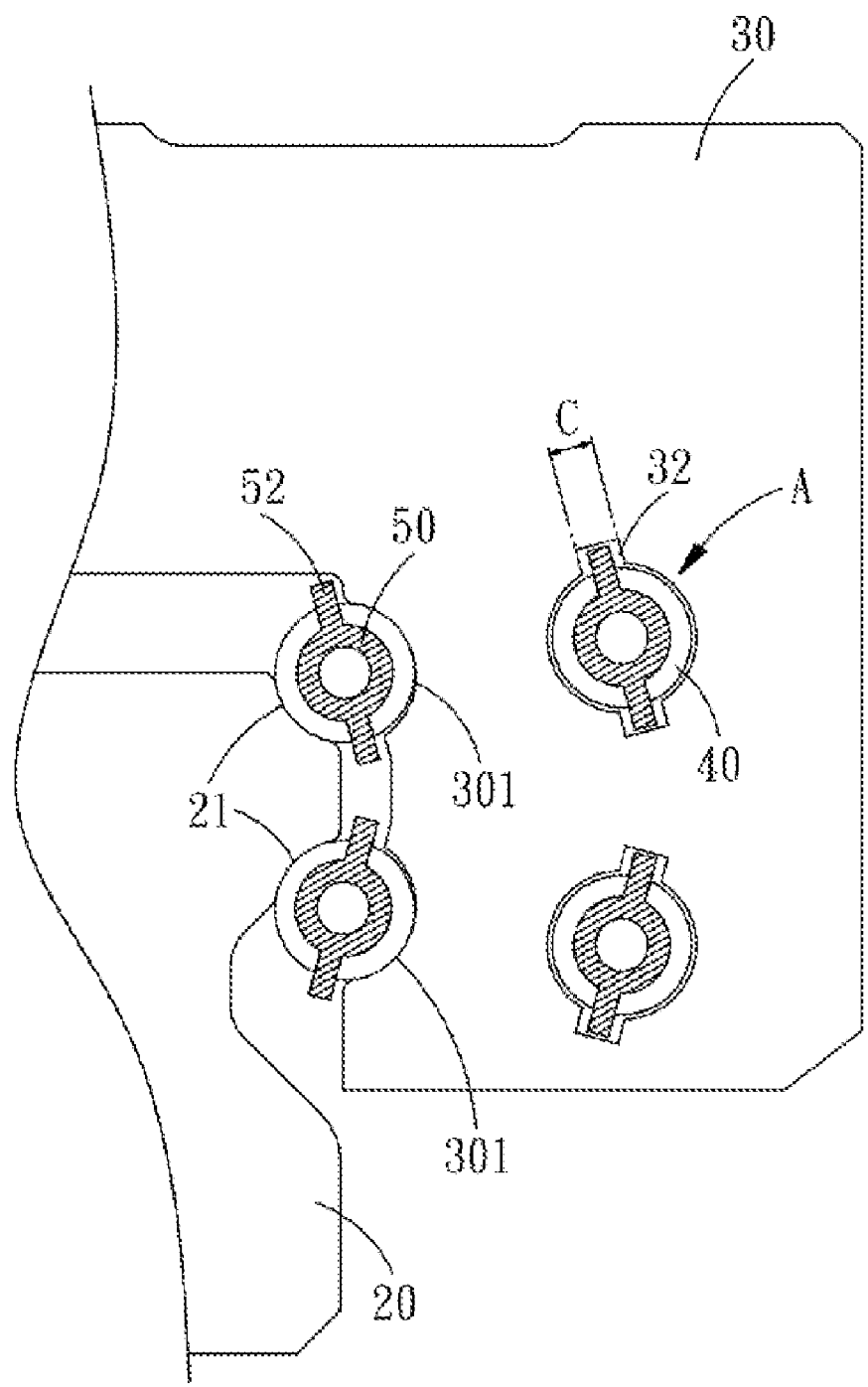
FIG. 6 is a cross-sectional view of the rolling element chain system for a linear guideway in accordance with the present invention.
Figure 7:
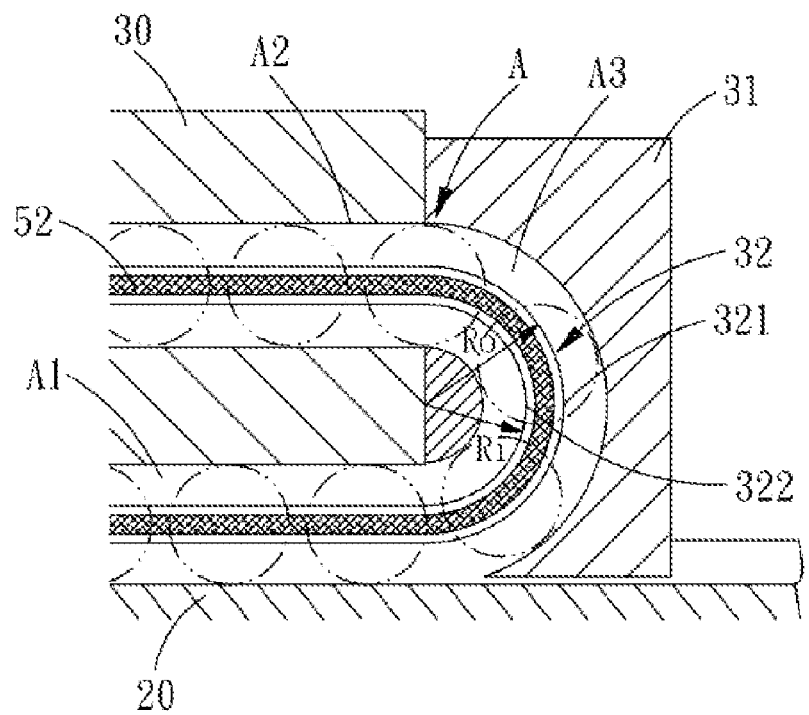
FIG. 7 is another cross-sectional view of the rolling element chain system for a linear guideway in accordance with the present invention.
Figure 8:
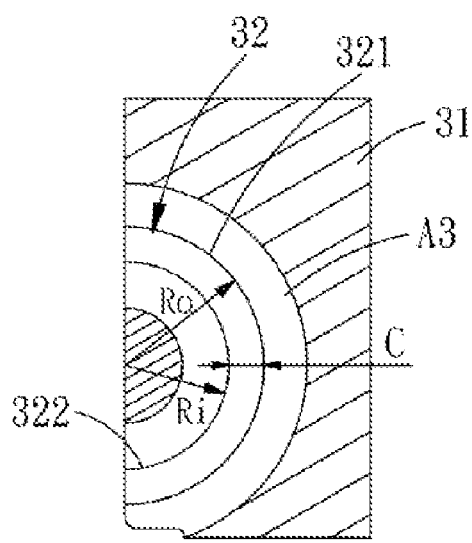
FIG. 8 is a cross-sectional view of the end cap in accordance with the present invention.
Figure 9:
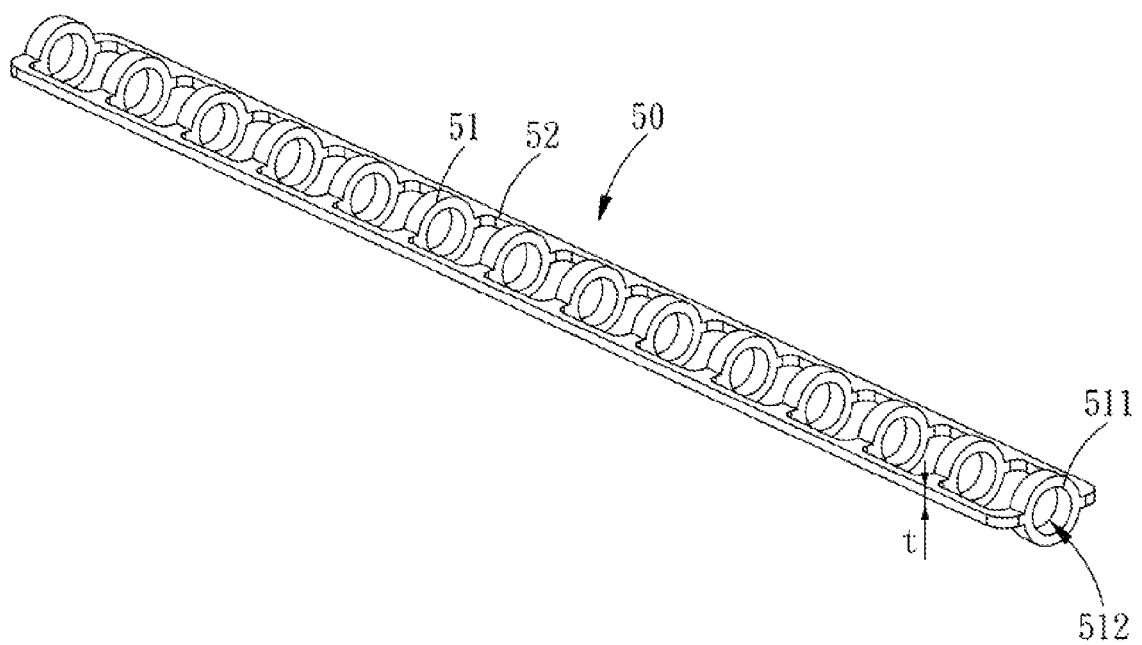
FIG. 9 is a perspective view of the rolling element chain system for a linear guideway in accordance with the present invention.
Figure 10:
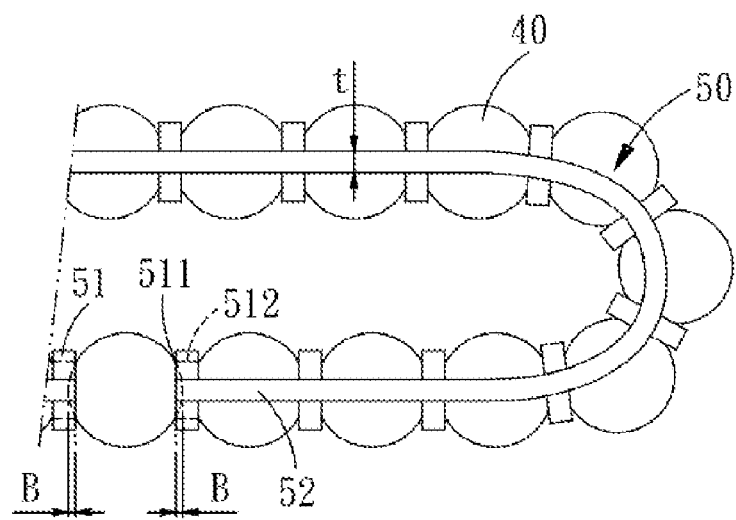
FIG. 10 is an assembly view of the rolling element chain and the rolling elements in accordance with the present invention.

The present invention will be clearer from the following description when viewed together with the accompanying drawings, which show, for purpose of illustrations only, the preferred embodiment in accordance with the present invention.

Referring to FIGS. 5-10, a rolling element chain system in accordance with the present invention comprises a slide rail 20, a slide block 30, a plurality of rolling elements 40 and a rolling element chain 50.

The slide rail 20 extends in the longitudinal direction thereof and is provided with first rolling grooves 21 allowing for rolling of the rolling elements 40.

The slide block 30 is provided with an end cap 31 at both ends thereof and is slidably mounted on the slide rail 20 with the rolling elements 40. The slide block 30 includes second rolling grooves 301 allowing for the rolling of the rolling elements 40. The slide block 30 cooperates with the end caps 31 to include plural circulating paths A defined by the first rolling grooves 21 of the slide rail 20 and the second rolling grooves 301 of the slide block. The circulating path A includes a loaded portion A1, a non-loaded portion A2 and a return portion A3. The circulating path A is formed with a guiding groove 32 in the circulating direction thereof. A part of the guiding groove 32 within the return portion A3 includes an outer side 321 and an inner side 322. In addition, the width of the guiding groove 32 is C, and the return portion A3 is formed in the end caps 31 at the two ends of the slide block 30. The part of the guiding groove 32 within the slide block 30 is formed in the non-loaded portion A2 and the return portion A3.

The respective rolling elements 40 roll in the circulating path A, namely roll between the first rolling groove 21 of the slide rail 20 and the second rolling groove 301 of the slide block 30 and will roll endlessly within the circulating path A.

The rolling element chain 50 includes a plurality of spacers 51 and two linking portions 52, and the rolling element chain 50 utilizes the respective spacers 50 to separate the rolling elements 40 from one another and utilizes the two linking portions 52 with the width t to link the spacers 50 with one another. The spacer 51 at each end of the rolling element chain 50 is formed with a through hole 512 in the moving direction of the chain, and the through hole 512 includes an outer periphery 511. The vertical depth that the rolling element 40 is inserted in the through hole 512 is the retaining capacity B of the chain 50 to hold the rolling element 40, and the above structure satisfies the following relation: $C<t+B/\pi$.

To enable the rolling element chain 50 to move in the guiding groove 32, the thickness t of the linking portion 52 must be smaller than the width C of the guiding groove 32, further in order to enable the spacers 51 at both ends of the rolling element chain 50 to retain the rolling element effectively, the above relation can be utilized to calculate the width C of the guiding groove 32 and the thickness t of the linking portion of the rolling element chain 50, so as to figure out the optimal range of the width C of the guiding groove 32.

The method on derivation of the above relation is described as follows. Both ends of a part of the circulating path A within the slide block 30 and the end caps 31 are bended over to form the return portion A3. The distance from the outer side 321 of the guiding groove 32 within the return portion A3 to the central axis of the return portion A3 is $R_o$, the distance from the inner side 322 of the guiding groove 32 within the return portion A3 to the central axis of the return portion A3 is Ri, and they satisfy the following relation:

$2\times[\pi(R_o-t/2)-\pi(R_i+t/2)]<2B$, so it can obtain the relation:

$R_o-R_i<t+B/\pi$.

Since the width C of the guiding groove 32 satisfies the relation: $C=R_o-R_i$, so it can obtain the relation: $C<t+B/\pi$.

The above relation can be used to determine the optimal relation between the thickness t of the linking portion 52 and the width C of the guiding groove 32, further the optimum value of the retaining capacity B for holding the rolling element 40 can be worked out from relation. With that, not only can the rolling element 40 between both ends of the rolling element chain 50 be prevented from falling off, but also other rolling elements 40 can be appropriately confined and consequentially prevented from falling off immediately when the slide block 30 is disengaged from the slide rail 20.

The data calculation is especially explained as follows.

| Items | Data (mm) |
|---|---|
| Diameter of the rolling element (D) | 10 |
| Radius of the part of the inner side of the guiding groove within the return portion ($R_i$) | 9.85 |
| Radius of the part of the outer side of the guiding groove within the return portion ($R_o$) | 10.15 |
| Width of the guiding groove (C) | 1.3 |
| Thickness of the linking portion (t) | 1.0 |
| Rolling element retaining capacity (B) | 1.0 |

The calculation principle is expressed as follows.

If the part of rolling element chain 50 within the return portion A3 abuts against the inner side 322 of the guiding groove 32, the length of the part of the rolling element chain 50 within the return portion A3 is $\pi(R_i+t/2)$.

If the part of the rolling element chain 50 within the return portion A3 abuts against the outer side 321 of the guiding groove 30, the length of the part of the rolling element chain 50 within the return portion A3 is $\pi(R_o+t/2)$.

Therefore, the length variation of the rolling element chain 50, which is caused by that the rolling element chain 50 respectively abuts against the inner side 322 and the outer side 321 of the guiding groove 30 is $2\times[\pi(R_o-t/2)-\pi(R_i+t/2)]$.

Hence, in order to enable the spacers 51 at both ends of the rolling element chain 50 to effectively retain the rolling element 40, the total retaining capacity of the spacers at both ends of the rolling element chain 50 to hold the rolling element 40 is 2B. In order to absorb the above length variation of the rolling element chain 50 adequately, the length variation must be smaller than 2B.

The calculation process is expressed as follows:

$2\times[\pi(R_o-t/2)-\pi(R_i+t/2)]<2B$, so $R_o-R_i<t+B/\pi$.

Because the width C of the guiding groove 32 can be expressed by the relation $C=R_o-R_i$, so the width C of the guiding groove 32 satisfies the relation:

$C<t+B/\pi$.

Wherein: $0<B<D$, so if the data in the above table is put into the above formula, it can figure out: $t+B/\pi=1.0+1.0/\pi=1.318$. As a result, if the width C of the guiding groove 32 in the present embodiment is 1.3 mm, the above requirements can be satisfied.

Figure 11:
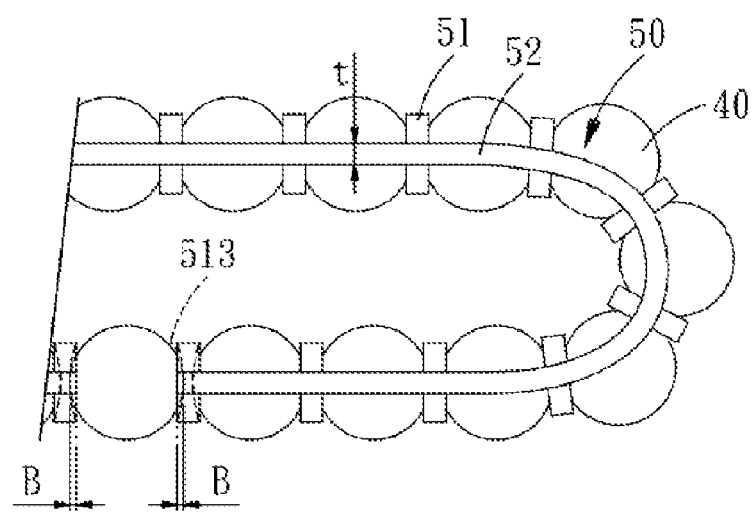
FIG. 11 is an assembly view of another rolling element chain and rolling elements in accordance with the present invention.

Referring to FIG. 11 which shows a rolling element chain 50 in accordance with another embodiment of the present invention, it is to be noted that the structures in the present embodiment which are the same as the first embodiment will be omitted here.

The rolling element chain 50 in accordance with the present embodiment of the present invention comprises a plurality of spacers 51 and two linking portions 52. The respective spacers 51 separates the rolling elements from one another, and the two linking portion 51 with the width t are located at two sides of the rolling elements respectively to link them with one another. The spacer 51 at each end of the rolling element chain 50 has an arc-shaped contacting surface 513 at both sides thereof, and the vertical height that the rolling element 40 is embedded in the arc-shaped contacting surface 513 is the retaining capacity B, and the above structure satisfies the following relation: $C<t+B/\pi$.

Hence, the present invention has the following advantages:

1. The spacer at the each end of the rolling element chain 50 has a predetermined retaining capacity to hold the rolling element 40, which not only can exert the guiding function when passing the return portion but can avoid the impact and interference.

2. With the optimal relation between the thickness t of the linking portion 52 and the width C of the guiding groove 32, the optimum value of the retaining capacity B for holding the rolling element 40 can be worked out, and the rolling element 40 between spacers at both ends of the chain 50 can be prevented from falling off.

3. With the optimal relation between the thickness t of the linking portion 52 and the width C of the guiding groove 32, other rolling elements 40 can be appropriately confined and consequentially prevented from falling off immediately when the slide block 30 is disengaged from the slide rail 20.

4. The spacer 51 at each end of the chain 50 can slightly slide relative to the rolling element 40 therebetween, offering a certain radial freedom.

5. With the relation: $C<t+B/\pi$, every rolling elements 40 can share the load evenly, especially the rolling element between both ends of the rolling element chain 50 will behave the same as other rolling elements 40 do, avoiding the occurrence of the uneven failure stress.

To summarize, the present invention relates to a rolling element chain system for a linear guideway, which comprises a slide rail, a slide block, a plurality of rolling elements and a rolling element chain. The circulating path of the slide block is interiorly provided with a guiding groove with width C, and the rolling elements roll within the circulating path while being retained by the rolling element chain. The rolling element chain includes a plurality of spacers for separating the rolling elements from one another, and linking portions with thickness t for linking the plurality of spacers with one another. The spacer at the each end of the rolling element chain has a retaining capacity B for holding the corresponding rolling element.

By satisfying the relation: $C=t+B/\pi$, the present invention can absorb the size variation while keeping the radial freedom and can avoid the interference and prevent the rolling elements from falling off.

While we have shown and described various embodiments in accordance with the present invention, it is clear to those skilled in the art that further embodiments may be made without departing from the scope of the present invention.

What is claimed is:

1. A rolling element chain system for a linear guideway comprising:
    a slide rail;
    a slide block being slidably mounted on the slide rail and being provided with an end cap at both ends thereof, the slide block cooperating with the end caps to define plural circulating paths, the circulating path being formed with a guiding groove with a width C in a circulating direction thereof;
    a plurality of rolling elements rolling in the circulating path; and
    a rolling element chain including a plurality of spacers and linking portions, the spacers of the rolling element chain serving to separate the rolling elements from one another, and the linking portions with a thickness t of the rolling element chain serving to link the rolling elements with one another, the spacer at each end of the rolling element chain having a retaining capacity B for holding the rolling element, and they satisfying the relation:
    $$C<t+B/\pi.$$

2. The rolling element chain system for a linear guideway as claimed in claim 1, wherein the spacer at each end of the rolling element chain has an arc-shaped contacting surface at both sides thereof, a vertical height that the rolling element is embedded in the arc-shaped contacting surface is the retaining capacity B.

3. The rolling element chain system for a linear guideway as claimed in claim 1, wherein the spacer at each end of the rolling element chain is formed with a through hole in a moving direction of the chain, a vertical depth that the rolling element is inserted into the through hole is the retaining capacity B.

4. The rolling element chain system for a linear guideway as claimed in claim 1, wherein both ends of a part of the circulating path within the slide block and the end caps is bended over to form a return portion, a distance from an outer side of the guiding groove within the return portion to a central axis of the return portion is $R_o$, a distance from an inner side of the guiding groove within the return portion to the central axis of the return portion is $R_i$, and they satisfy the relation: $2\times[\pi(R_o-t/2)-\pi(R_i+t/2)]<2B$.

5. The rolling element chain system for a linear guideway as claimed in claim 4, wherein the slide block is provided with an end cap at both ends thereof, the circulating path includes a loaded portion, a non-loaded portion and a return portion, the return portion is formed in the end caps at the both ends of the slide block, and the guiding groove in the slide block is formed in the non-loaded portion and the return portion.

\* \* \* \* \*